United States Patent
Osa (10) Patent No.: US 12,267,001 B2
(45) Date of Patent: Apr. 1, 2025

(54) HIGH-VOLTAGE POWER SUPPLY DEVICE

(71) Applicant: SHIMADZU CORPORATION, Kyoto (JP)

(72) Inventor: Haruki Osa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 399 days.

(21) Appl. No.: 17/868,129

(22) Filed: Jul. 19, 2022

(65) Prior Publication Data
US 2023/0073162 A1    Mar. 9, 2023

(30) Foreign Application Priority Data
Sep. 8, 2021   (JP) .................. 2021-145858

(51) Int. Cl.
*H02M 1/08*    (2006.01)
*H02M 1/00*    (2006.01)
(Continued)

(52) U.S. Cl.
CPC .......... *H02M 1/08* (2013.01); *H02M 1/0029* (2021.05); *H02M 5/458* (2013.01); *H01J 49/022* (2013.01); *H02M 11/00* (2013.01)

(58) Field of Classification Search
CPC ............... H01J 49/0095; H01J 49/022; H02M 1/08–092; H02M 1/01–32;
(Continued)

(56) References Cited

U.S. PATENT DOCUMENTS 9,461,642 B1 * 10/2016 Pickens .................. H03K 3/013
2011/0101218 A1 * 5/2011 Makarov ............... H01J 49/022
                                                              250/281
(Continued)

FOREIGN PATENT DOCUMENTS

CN       206281818 U  *  6/2017
JP         6516062 B2    5/2019
WO   WO-2017145380 A1 *  8/2017  .............. H01J 49/06

OTHER PUBLICATIONS

Machine translation of CN-206281818-U, Jun. 27, 2017. (Year: 2017).*

(Continued)

*Primary Examiner* — Fred E Finch, III
(74) *Attorney, Agent, or Firm* — Muir Patent Law, PLLC (57) ABSTRACT

According to one aspect of the present invention, a high-voltage power supply device outputs a high voltage of both positive and negative polarities in a switchable manner and includes: a first voltage generation unit; a second voltage generation unit; a first discharging diode connected to the first voltage generation unit; a second discharging diode connected to a the second voltage generation; a first output circuit connected including a first switch and a protective resistor connected in series to each other; a second output circuit including a second switch and a protective resistor connected in series to each other; an output capacitor connected in parallel to a load; a controller controlling the voltage generation units and opening/closing operations of the switches; limitation units configured to limit a time rate of change of a voltage between ends of the a respective switch.

5 Claims, 4 Drawing Sheets (51) Int. Cl.
*H02M 5/458* (2006.01)
*H02M 11/00* (2006.01)
*H01J 49/02* (2006.01)

(58) Field of Classification Search
CPC ..... H02M 5/458; H03K 17/08; H03K 17/081; H03K 17/08104; H03K 17/0812; H03K 17/08122; H03K 17/28; H03K 17/284; H03K 17/302
See application file for complete search history.

(56) References Cited

U.S. PATENT DOCUMENTS

2015/0287580 A1* 10/2015 Mizutani ........... H02M 3/33507
    250/292
2019/0006168 A1* 1/2019 Mizutani ................. H01J 49/10

OTHER PUBLICATIONS

Machine translation of WO-2017145380, Aug. 31, 2017. (Year: 2017).*

* cited by examiner

HIGH-VOLTAGE POWER SUPPLY DEVICE

CROSS-REFERENCE TO RELATED APPLICATIONS

This application claims priority under 35 U.S.C. § 119 to Japanese Patent Application No. 2021-145858 filed on Sep. 8, 2021, the entire disclosure of which is incorporated herein by reference in its entirety.

BACKGROUND OF THE INVENTION

Field of the Invention

The present invention relates to a high-voltage power supply device, and more particularly to a high-voltage power supply device capable of outputting a voltage of a positive polarity and a negative polarity in a switchable manner.

Description of the Related Art

The following description sets forth the inventors' knowledge of related art and problems therein and should not be construed as an admission of knowledge in the prior art.

In a mass spectrometer, various compounds in a sample are ionized, and the generated ions are separated and detected according to the mass-to-charge ratio (m/z), and the compound is identified or the compound is quantified based on the detection signal. There are two types of compounds, one that is likely to be positively ionized and the other that is likely to be negatively ionized. Therefore, the gas chromatographic mass spectrometer and the liquid chromatographic mass spectrometer generally each have a function of repeatedly performing measurements while alternately switching between a positive ion measurement mode and a negative ion measurement mode.

In the positive ion measurement mode and the negative ion measurement mode, it is necessary to switch the polarity of the voltage applied to each constituent element, such as, e.g., the ion source, the mass separator, and the ion detector of the mass spectrometer. In order to switch between the positive ion measuring mode and the negative ion measuring mode at high speed, the polarity of each applied voltage must be switched at high speed, and therefore, there has been used a high-voltage power supply device capable of switching the polarities of the output voltage at high speed.

As one such a high-voltage power supply device, the device described in Patent Document 1 is known. This high-voltage power supply is provided with: a positive voltage generation unit that generates a high voltage of a positive polarity +HV; a negative voltage generation unit that generates a high voltage of a negative polarity −HV; a discharging diode connected such that when a voltage is outputted to the voltage output end of the positive voltage generation unit, the voltage is applied to the discharging diode in a reverse biased state; a discharging diode connected such that when a voltage is outputted to the voltage output end of the negative voltage generation unit, the voltage is applied to the discharging diode in a reverse biased state; a high-voltage switch provided on a positive polarity side; a high-voltage switch provided on a negative polarity side; a protective resistor inserted between the output end of the high-voltage switch and the common voltage output end to limit the surge current flowing through the high-voltage switch on the positive polarity side; a protective resistor inserted between the output end of the high-voltage switch and the common voltage output end to limit the surge current flowing through the high-voltage switch on the negative polarity side; and an output capacitor connected to a load in parallel to stabilize the potential of the load connected to the common voltage output end.

When outputting a high voltage of a positive polarity to a load, the high-voltage switch on the positive polarity side is turned on, and the high-voltage switch on the negative polarity side is turned off to thereby set the positive voltage generation unit to an operating status and set the negative voltage generation unit to a stopped status. When outputting a high voltage of a negative polarity to the load, the high-voltage switch on the positive polarity side is turned off, and the high-voltage switch on the negative polarity side is turned on to thereby set the positive voltage generation unit to a stopped status and set the negative voltage generation unit to an operating status. In either case, the output capacitor or the like is charged by the power supplied from the positive voltage generation unit or the negative voltage generation unit to the load. When switching the output voltage polarity, both the voltage generation units are stopped, and both the high-voltage switches are turned on. With this, the charges accumulated in the output capacitor are discharge through one of the discharging diodes. Further, the charges accumulated in the capacitors of the rectifying circuit, the smoothing circuitry, etc., included in the positive voltage generation unit and the negative voltage generation unit are also discharged through one of the discharging diodes at the same time.

In the conventional high-voltage power supply device described above, by quickly discharging the charges accumulated in the output capacitor or the like through discharging diode as described above, it is possible to shorten the time required for switching the polarity of the output voltage, as compared with the power supply device known before.

PRIOR ART DOCUMENT

Patent Document

Patent Document 1: Japanese Patent No. 6516062

SUMMARY OF THE INVENTION

Problems to be Solved by the Invention

When a high voltage is being applied to a load from a high-voltage power supply device as described above, in some cases, the load current suddenly varies depending on the load condition. For example, in a case where an ion injecting high-voltage is applied to the orthogonal acceleration section in an orthogonal acceleration time-of-flight mass spectrometer (OA-TOFMS) from a high-voltage power supply device, when the amount of ions introduced into the orthogonal acceleration section suddenly increases, the load current of the high-voltage power supply device suddenly varies.

When the output voltage varies in accordance with the sudden change in the load current, the initial energy applied to the ions in the orthogonal acceleration section varies, resulting in deterioration of the measurement accuracy of the mass accuracy, etc. Therefore, it is desirable to suppress the change in the output voltage as much as possible even in the case of a sudden change in the load current. In order to suppress the output voltage change at the time of the sudden change in the load current in the above-described conventional high-voltage power supply device, it is necessary to increase the capacitance of the output capacitor or decrease the resistance value of the protective resistor to reduce the output impedance.

However, in a case where the capacitance of the output capacitor is increased, the discharging time and the charging time of the capacitor become longer, resulting in a longer polarity reversal time of the output voltage. Further, the size of the capacitor becomes large, and therefore, there is a possibility that the size of the power supply device itself has to be increased.

On the other hand, in a case where the resistance value of the protective resistor is reduced, the switching current flowing through the high-voltage switch increases, and therefore, there is a possibility that the high-voltage switch becomes likely to break down or the life of the switch is shortened. Further, the selection of a high-voltage switch having a larger maximum rating of current causes a problem that the switch becomes enlarged and costly The present invention has been made to solve the above-described problems. The present invention aims to provide a high-voltage power supply device capable of suppressing variations of voltage at the time of sudden changes in a load current while suppressing the increase in equipment size and cost as much as possible.

Means for Solving the Problem

According to one aspect of a high-voltage power supply device according to the present invention made to solve the above-described problems, a high-voltage power supply device capable of outputting a high voltage of a positive polarity and a high voltage of a negative polarity in a switchable manner, includes:

a first voltage generation unit configured to output the high voltage of the positive polarity;

a second voltage generation unit configured to output the high voltage of the negative polarity;

a first discharging diode connected to a voltage output end of the first voltage generation unit such that when a high voltage is outputted to the voltage output end of the first voltage generation unit, the high voltage is applied to the first discharging diode in a reverse biased state;

a second discharging diode connected to a voltage output end of the second voltage generation unit such that when a high voltage is outputted to the voltage output end of the second generation unit, the high voltage is applied to the second discharge diode in a reverse biased state;

a first output circuit connected between the voltage output end of the first voltage generation unit and a polarity switching voltage output end which is common to both the positive polarity and the negative polarity, the first output circuit being configured by a first switch and a protective resistor connected in series to each other, the first switch being configured by a voltage-controlled semiconductor switch;

a second output circuit connected between the voltage output end of the second voltage generation unit and the polarity switching voltage output end, the second output circuit being configured by a second switch and a protective resistor connected in series to each other, the second switch being configured by a voltage-controlled semiconductor switch;

an output capacitor connected in parallel to a load that is to be connected to the polarity switching voltage output end;

a controller configured to control operations of the first voltage generation unit and the second voltage generation unit and opening/closing operations of the first switch and the second switch such that both the first voltage generation unit and the second voltage generation unit are turned on once in a state in which both the operations of the first voltage generation unit and the second voltage generation unit are stopped, when switching a polarity of a voltage outputted from the polarity switching voltage output end;

a first limitation unit configured to limit a time rate of change of a voltage between both ends of the first switch when the controller turns on the first switch; and a second limitation unit configured to limit a time rate of change of a voltage between both ends of the second switch when the controller turns on the second switch.

In the high-voltage power supply device according to the above-described aspect of the present invention, as the first switch and the second switch which are each configured by a voltage-controlled semiconductor switch, one or a plurality of power MOSFETs connected in series in a multi-stage manner, or one or a plurality of IGBTs (Insulated Gate Bipolar Transistor) connected in series in a multi-stage manner) may be used.

Effects of the Invention

In the high-voltage power supply device according to the above-described aspect of the present invention, when the controller turns on the first switch (the second switch), the first limitation unit (the second limitation unit) maintains the time rate of change of the voltage between both ends of the first switch (second switch) substantially constant. Therefore, the current flowing through the switch at the time of turning on the first switch (second switch) also becomes substantially constant. This makes it possible to limit the current flowing through the switch due to the charges discharged from the output capacitor or the like at the time of turning on the switch, without depending on the protective resistor whose main purpose is to limit a surge current. Thus, the resistance value of the protective resistor can be determined without being constrained by the maximum switching power allowed for the switch. Consequently, it is possible to set the resistance value of the protective resistor lower than that in a conventional device while suppressing the maximum rating of current of the first switch (the second switch). Therefore, by reducing the output impedance by decreasing the resistance value of the protective resistor, it becomes possible to suppress variations of the output voltage at the time of the sudden change in the load current.

As described above, according to the high-voltage power supply device according to the above-described aspect of the present invention, without adopting a large-sized semiconductor having a larger maximum rating of current, which leads to an increase in size and cost of the device, it is possible to suppress variations of the output voltage at the time of the sudden change in the load current. With this, for example, in the case of using the high-voltage power supply device of the above-described embodiment as a power supply for an orthogonal ion acceleration section in an OA-TOFMS, even if the amount of ions introduced into the orthogonal ion acceleration section varies greatly, the change in the injection voltage can be suppressed, which in turn can keep the mass accuracy and the mass resolution in a high condition.

BRIEF DESCRIPTION OF THE DRAWINGS

The preferred embodiments of the present invention are shown by way of example, and not limitation, in the accompanying figures.

EMBODIMENTS FOR CARRYING OUT THE INVENTION

Hereinafter, a polarity switching high-voltage power supply device, which is an embodiment of a high-voltage power supply device according to the present invention, will be described in detail with reference to the attached drawings.

Figure 1:
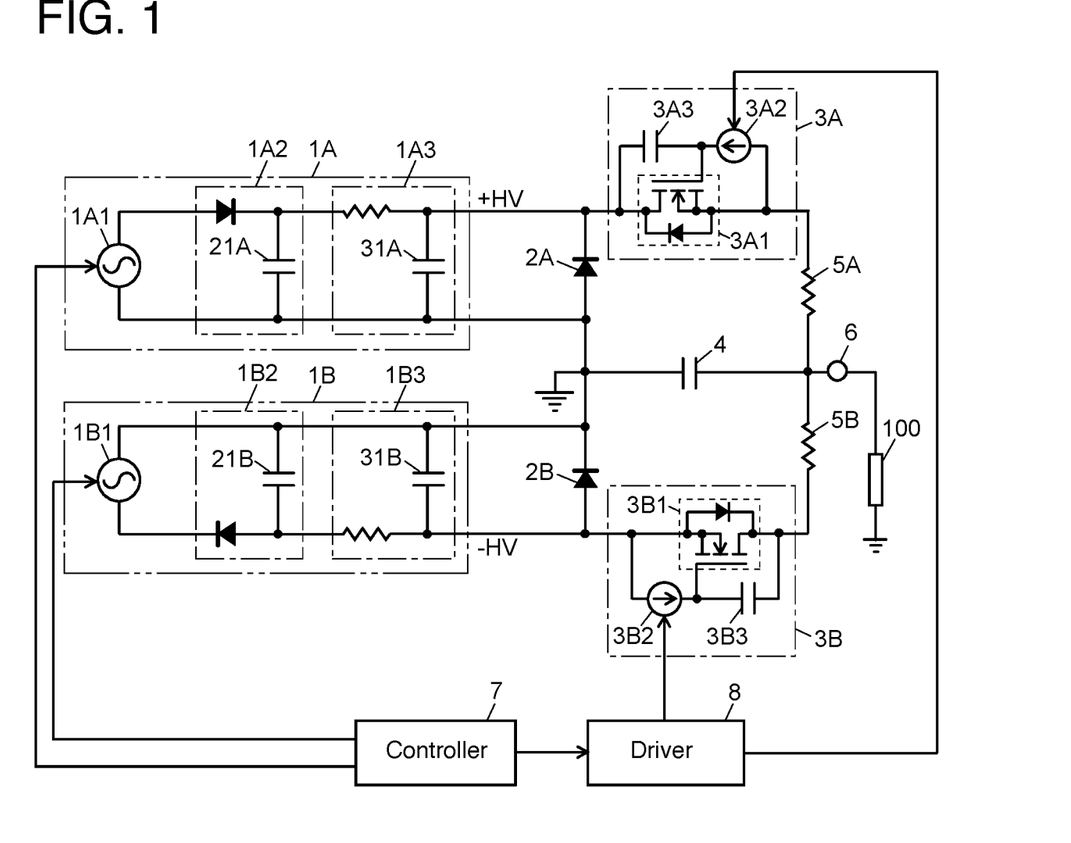
FIG. 1 is a schematic diagram of a polarity switching high-voltage power supply device, which is an embodiment of the present invention.
Figure 2:
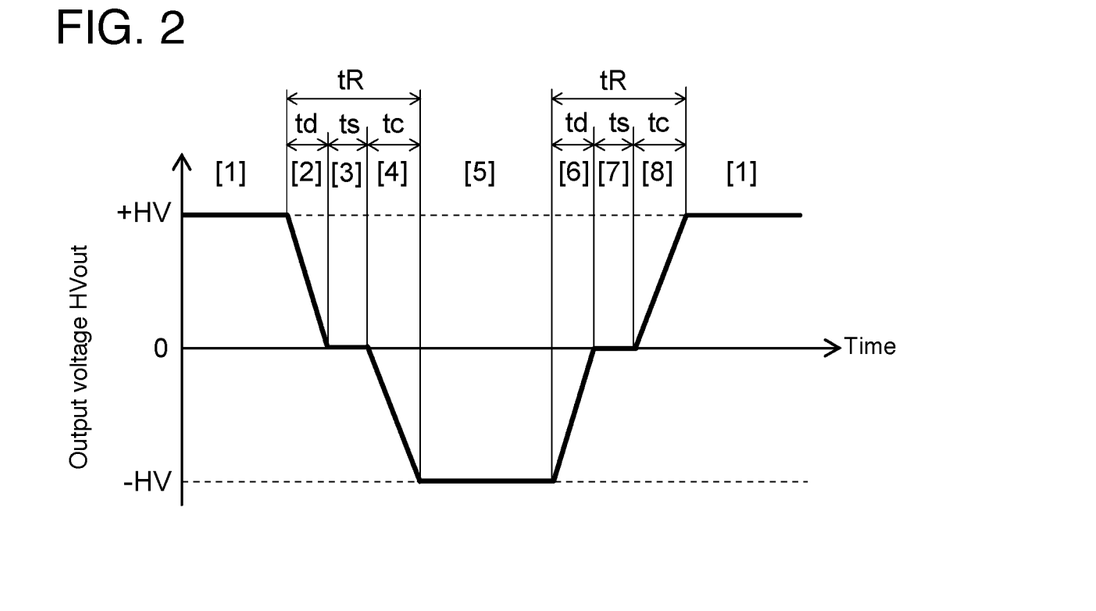
FIG. 2 is an example of a waveform diagram of an output voltage at the time of positive/negative polarity switching of the polarity switching high-voltage power supply device of the embodiment.
Figure 3:
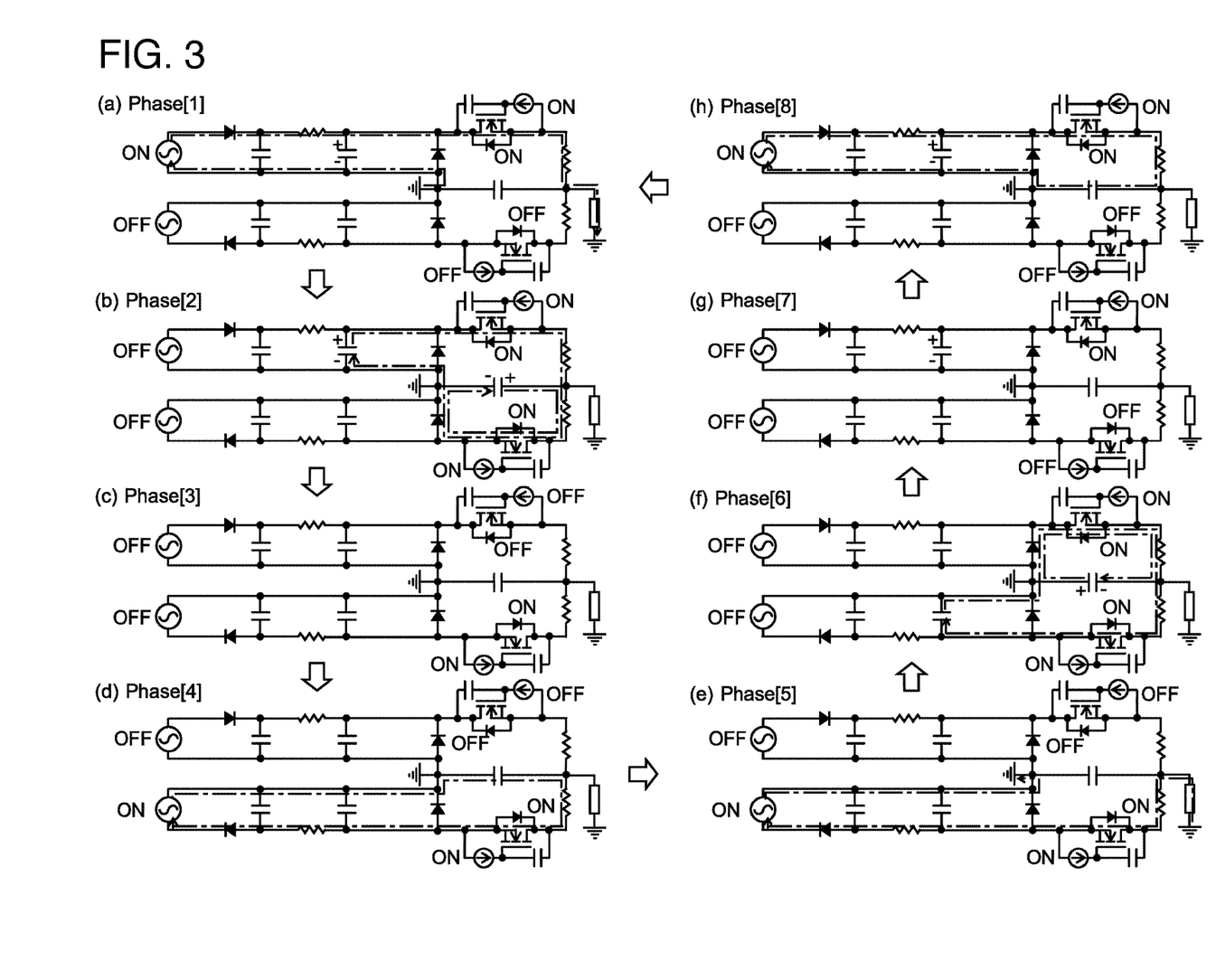
FIG. 3 is an operation explanatory view of the polarity switching high-voltage power supply device of the embodiment.

FIG. 1 is a schematic circuit diagram of a polarity switching high-voltage power supply device of this embodiment. FIG. 2 is an example of a schematic waveform-form diagram of an output voltage at the time of positive/negative polarity switching of the polarity switching high-voltage power supply device of this embodiment. FIG. 3 is an operation explanatory view of a polarity switching high-voltage power supply device of this embodiment.

The polarity switching high-voltage power supply device of this embodiment is provided with, as shown in FIG. 1, a positive voltage generation unit 1A that generates a high voltage +HV of a positive polarity, a negative voltage generation unit 1B that generates a high voltage −HV of a negative polarity, a positive polarity side discharging diode 2A, a negative polarity side discharging diode 2B, a positive polarity side high-voltage switch unit 3A, a negative polarity side high-voltage switch unit 3B, a positive polarity side protective resistor 5A, a negative polarity side protective resistor 5B, and an output capacitor 4.

The positive voltage generation unit 1A includes an excitation circuit 1A1 for outputting a high-voltage high-frequency AC signal, a rectifying circuit 1A2 for converting the high-frequency AC signal to a DC high-voltage, and a filtering circuit 1A3 for removing ripple voltages included in the DC high-voltage. Similar to the positive voltage generation unit 1A, the negative voltage generation unit 1B includes an excitation circuit 1B1 that outputs a high-voltage high-frequency AC signal, a rectifying circuit 1B2 for converting the high-voltage high-frequency AC signal to a DC high-voltage, and a filtering circuit 1B3 for removing ripple voltages contained in the DC high-voltage.

The discharging diode 2A(2B) is connected to the output end of the positive voltage generation unit 1A (the negative voltage generation unit 1B) in a direction in which when a voltage is outputted to the output end of the positive voltage generation unit 1A (the negative voltage generation unit 1B), the voltage is applied to the discharging diode 2A(2B) in a reverse biased state. The discharging diode 2A(2B) has a function of discharging the charges stored in the capacitor 21A(21B) included in the rectifying circuit 1A2(1B2), the capacitor 31A(31B) included in the filtering circuit 1A3(1B3), and the output capacitor 4.

The positive polarity side high-voltage switch unit 3A includes a power MOSFET 3A1, which is one type of a voltage-controlled semiconductor switch, a constant current source 3A2 connected between a source terminal (hereinafter sometimes referred to as "S terminal") and a gate terminal G (hereinafter sometimes referred to as "G terminal") of the power MOSFET 3A1, and a feedback capacitor 3A3 connected between a drain terminal (hereinafter sometimes referred to as "D terminal") and the G terminal of the power MOSFET 3A1.

The negative polarity side high-voltage switch unit 3B also includes, like the positive polarity side high-voltage switch unit 3A, a power MOSFET 3B1, which is one type of a voltage-controlled semiconductor switch, a constant current source 3B2 connected between the S terminal and the G terminal of the power MOSFET 3B1, and a feedback capacitor 3B3 connected between the D terminal and the G terminal of the power MOSFET 3B1.

The voltage output end to which the DC high-voltage of a positive polarity by the positive voltage generation unit 1A is outputted is connected to the D terminal of the power MOSFET 3A1, and the protective resistor 5A is connected between the S terminal of the power MOSFET 3A1 and the common voltage output end 6. The voltage output end to which the DC high-voltage of a negative polarity by the negative voltage generation unit 1B is outputted is connected to the S terminal of the power MOSFET 3B1, and the protective resistor 5B is connected between the D terminal of the power MOSFET 3B1 and the common voltage output end 6.

The protective resistor 5A(5B) mainly has a function to limit the surge current that occurs when unintentional discharging or the like occurs in the load 100 to prevent flowing of a current exceeding a current rating of the power MOSFET 3A1(3B1). The output capacitor 4 is connected between the common voltage output end 6 and the ground potential and has a function to stabilize the potential of the load 100.

The controller 7 controls the operation of the excitation circuit 1A1(1B1) and turns on/off the power MOSFET 3A1(3B1) by turning on/off the constant current source 3A2(3B2) via the driver 8. The controller 7 may be configured mainly by a microcomputer including, for example, a CPU, a RAM, a ROM, and the like.

In that case, for example, a program corresponding to a series of control sequences over time for outputting a voltage waveform as described later is stored in a ROM or the like, and a control signal can be outputted by executing this program by the CPU. Further, instead of using a microcomputer, the same function can be achieved by a hardware circuit, such as, e.g., a digital signal processor.

Next, the output operation of a voltage waveform in the polarity switching high-voltage power supply device of this embodiment will be described with reference to FIGS. 2 and 3.

In FIG. 3, Phase [1] is a state in which a high voltage +HV of a positive polarity is steadily outputted from the common voltage output end 6 to the load 100. Phase [5] is a state in which a high voltage −HV of a negative polarity is steadily outputted from the common voltage output end 6 to the load 100. In the case of inverting the polarity of the output voltage from the positive polarity to the negative polarity, the state sequentially changes from the positive voltage steady output state of Phase [1] to the negative voltage steady output state of Phase [5] through Phase [2]→Phase [3]→Phase [4].

On the other hand, in the case of inverting the polarity of the output voltage from the negative polarity to the positive polarity, the state sequentially changes from the negative voltage steady output state of Phase [5] to the positive voltage steady output state of Phase [1] through Phase [6]→Phase [7]→Phase [8]. Each of the periods [1] to [8] in the voltage-waveform shown in FIG. 2 corresponds to Phase [1] to Phase [8] in FIG. 3.

As shown in (a) in FIG. 3, in Phase [1], the positive polarity side excitation circuit 1A1 maintains the ON (operating) state, and the positive polarity side high-voltage switch unit 3A maintains the ON (conducting) state. The DC high voltage +HV generated by the positive voltage generation unit 1A is applied to the output capacitor 4 and the load 100 via the positive polarity side high-voltage switch unit 3A and the positive polarity side protective resistor 5A to thereby cause a current flow through the load 100 as shown in the figure.

As shown in (b) of FIG. 3, in Phase [2], the controller 7 puts the excitation circuit 1A1 of a positive polarity to an OFF (stop) state and switches the negative polarity side high-voltage switch unit 3B from an OFF (cut off) state to an ON (conducting) state, that is, turns on the negative polarity side high-voltage switch unit 3B, while keeping the positive polarity side high-voltage switch unit 3A in an ON (conducting) state. When the negative polarity side high-voltage switch unit 3B is turned on, the charges accumulated immediately before that in the capacitors 21A and 31A, which are included in the rectifying circuit 1A2 and the filtering circuit 1A3 on the positive polarity side, and the output capacitor 4 are discharged along the current path indicated by a chain line in (b) of FIG. 3 via the protective resistors 5A and 5B and the negative polarity side discharging diode 2B.

The turn-on operation of the negative polarity side high-voltage switch unit 3B described above is performed in a state in which the time rate of change (slew rate) of the drain-source voltage of the power MOSFET 3B1 is kept substantially constant by the action of the feedback capacitor 3B3 and the constant current source 3B2 constituting the negative polarity side high-voltage switch unit 3B. Therefore, an excessive discharging current does not flow through the power MOSFET 3B1 regardless of the resistance values of the protective resistors 5A and 5B. The reason why the time rate of change of the drain-source voltage of the power MOSFET 3B1 becomes constant due to the action of the feedback capacitor 3B3 and the constant current source 3B2 will be described in detail later.

Note that in the above-described discharging through the current path described above, most of the energy stored in the capacitor 21A and the capacitor 31A included in the rectifying circuit 1A2 and the filtering circuit 1A3, respectively, on the positive polarity side and the output capacitor 4 is consumed (converted into heat) in the power MOSFET 3B1.

As shown in (c) in FIG. 3, in Phase [3], the controller 7 stops the operation of the constant current source 3A2 to thereby switch (turn off) the positive polarity side high-voltage switch unit 3A from the ON (conducting) state to the OFF (cut off) state.

As will be described in detail later, the charges accumulated between the gate and the source of the power MOSFET 3A1 at this time are discharged through a bleeder resistor (not shown) connected in parallel to the constant current source 3A2, thereby lowering the gate voltage, which in turn can cause the power MOSFET 3A1 to be shifted to the OFF state. On the other hand, the negative polarity side high-voltage switch unit 3B maintains the ON (conducting) state.

As shown in (d) of FIG. 3, in Phase [4], the controller 7 puts the excitation circuit 1B1 on the negative polarity side in an ON (operating) state. With this, the output capacitor 4 is charged in a negative polarity, thereby increasing the absolute value of the output voltage. When the output voltage reaches a desired voltage value, the state shifts to Phase [5].

As shown in (e) in FIG. 3, in Phase [5], the excitation circuit 1B1 on the negative polarity side maintains the ON (operating) state, and the negative polarity side high-voltage switch unit 3B maintains the ON (conducting) state. At this time, the DC high voltage −HV generated by the negative voltage generation unit 1B is applied to the output capacitor 4 and the load 100 through the negative polarity side high-voltage switch unit 3B and the negative protective resistor 5B.

As shown in (f) in FIG. 3, in Phase [6], the controller 7 puts the negative polarity side excitation circuit 1B1 in an OFF (stopped) state and switches the positive polarity side high-voltage switch unit 3A from the OFF (cut off) state to the ON (conducting) state, that is, turns on the positive polarity side high-voltage switch unit 3A, while maintaining the ON (conducting) state of the negative polarity side high-voltage switch unit 3B. The charges accumulated in the capacitor 21B and the capacitor 31B included in the rectifying circuit 1B2 and the filtering circuit 1B3, respectively, and in the output capacitor 4 are discharged through the protective resistors 5A and 5B and the positive polarity side discharging diode 2A along the current path indicated by the chain line shown in (f) of FIG. 3.

The turn-on operation of the positive polarity side high-voltage switch unit 3A described above is performed in a state in which the time rate of change (slew rate) of the drain-source voltage of the power MOSFET 3A1 is kept substantially constant by the action of the feedback capacitor 3A3 and the constant current source 3A2 constituting the positive polarity side high-voltage switch unit 3A. Therefore, an excessive discharging current does not flow through the power MOSFET 3A1, regardless of the resistance values of the protective resistors 5A and 5B.

Note that in the above-described discharging through the current path described above, most of the energy stored in the capacitor 21B and the capacitor 31B included in the rectifying circuit 1B2 and the filtering circuit 1B3, respectively, on the positive polarity side and the output capacitor 4 is consumed (converted into heat) in the power MOSFET 3A.

As shown in (g) of FIG. 3, in Phase [7], the controller 7 switches the negative polarity side high-voltage switch unit 3B from the ON (conducting) state to the OFF (cutoff) state, that is, turns off the negative polarity side high-voltage switch unit 3B. On the other hand, the positive polarity side high-voltage switch unit 3A maintains the ON (conducting) state.

As shown in (h) of FIG. 3, in Phase [8], the controller 7 puts the positive polarity side excitation circuit 1A1 in an ON (operating) state. With this, the output capacitor 4 is charged to the positive polarity, thereby increasing the output voltage. When the output voltage reaches the desired voltage value, the state shifts to Phase [1].

As described above, in the output voltage waveform shown in FIG. 2, the periods [1] to [8] correspond to Phase [1] to Phase [8] described above. The time required to reverse the polarity of the output voltage from positive to negative or vice versa, i.e., the polarity reversal time tR, is the sum of a discharging time "td," a turn-off time "ts," and a charging time "tc." The discharging time "td" is a discharging time during which the energy stored in the capacitor 21A(31A) and the capacitor 21B(31B) included in the rectifying circuit 1A2 (1B2) and the filtering circuit 1A3 (1B3), respectively, and the output capacitor 4 is consumed in the power MOSFET 3A1 (3B1) to reduce the output voltage. The turn-off time "ts" is a turn-off time of the high-voltage switch unit 3A(3B). The charging time "tc" is a time during which the excitation circuit 1A1(1B1) of the high-voltage switch unit 1A(1B) is operated to increase the output voltage to a desired voltage. The discharging time "td" is determined by the product of the output voltage and the inverse of the time rate of change (slew rate) of the voltage in the power MOSFET 3A1(3B1).

Figure 4:
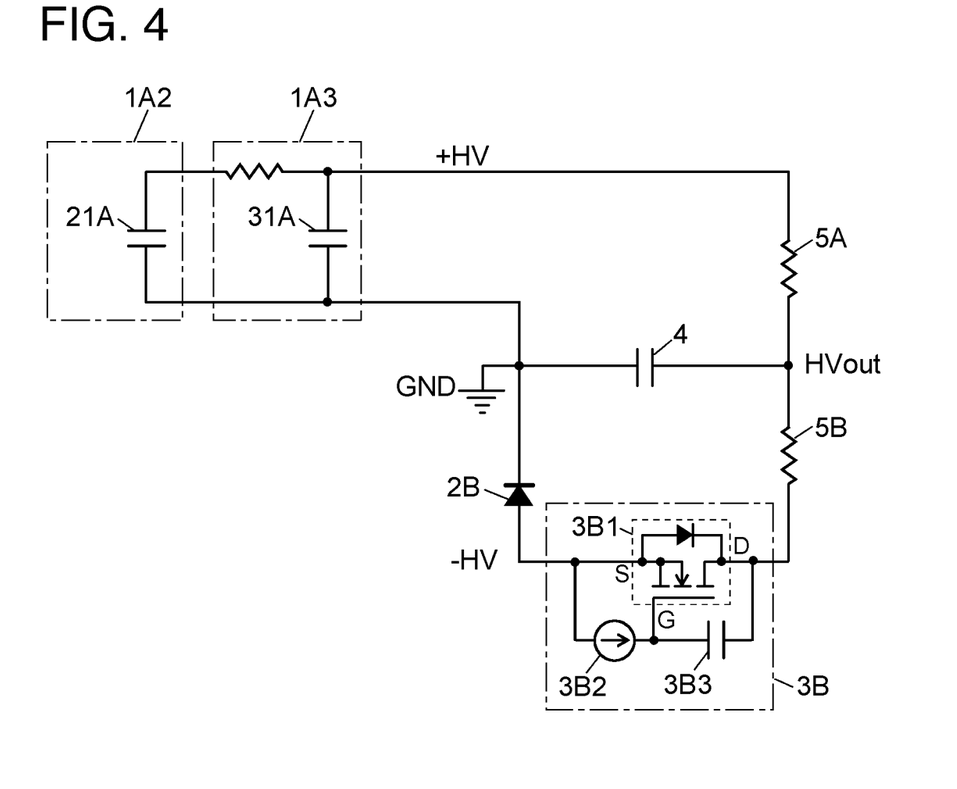
FIG. 4 shows an equivalent circuit in a period of Phase [2] in the polarity switching high-voltage power supply device of the embodiment.
Figure 5:
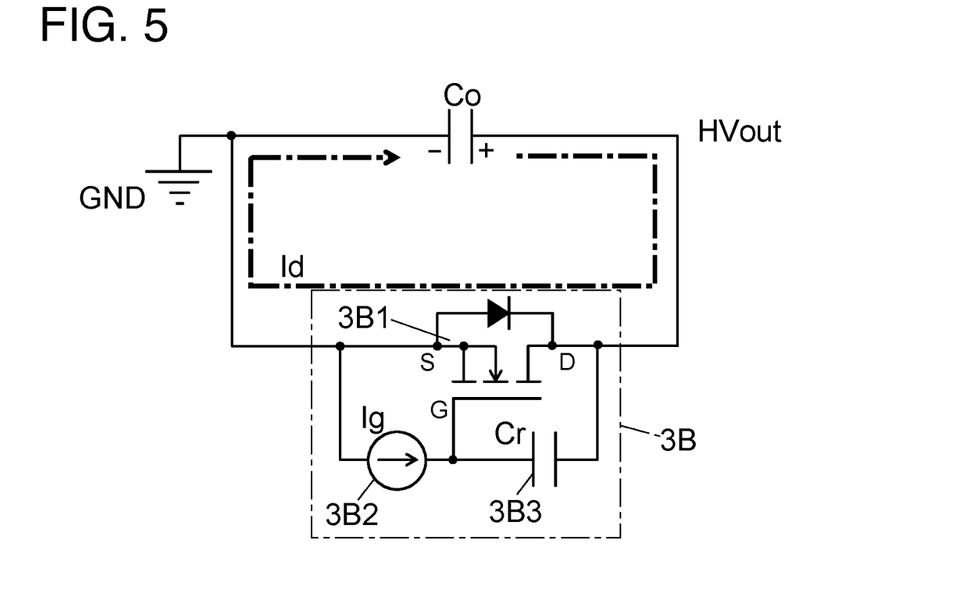
FIG. 5 is an equivalent circuit in which the equivalent circuit shown in FIG. 4 is more simplified.

FIG. 4 shows an equivalent circuit during the period of Phase [2] in the polarity switching high-voltage power supply device of this embodiment. FIG. 5 is a more simplified equivalent circuit in which the protective resistors 5A and 5B, the resistor of the filtering circuit 1A3, and the negative polarity side discharging diode 2B shown in FIG. 4 are ignored, and the combined capacitance of the capacitor 21A of the rectifying circuit 1A2, the capacitor 31A of the filtering circuit 1A3, and the output capacitor 4 is rewritten with Co. Using the equivalent circuit, the reason why the time rate of change of the drain-source voltage in the turn-on operation of the power MOSFET becomes substantially constant will be described.

Here, the direction of the current in which the voltage across the ends of the feedback capacitor 3B3 increases is defined as a "charge direction," and the direction of the current in which the voltage across the ends decreases is defined as a "discharge direction."

In FIG. 5, since the power MOSFET 3B1 is initially in an OFF state, a voltage equal to the voltage of the output capacitor 4 is being applied to the feedback capacitor 3B3. In this state, when the constant current source 3B2 is turned from the OFF state to the ON state, the feedback capacitor 3B3 is discharged by the current supplied from the constant current source 3B2. As a result, the gate-drain voltage of the power MOSFET 3B1 decreases, and the gate-source voltage thereof increases. Then, when this gate-source voltage reaches the gate threshold voltage Vth of the power MOSFET 3B1, the power MOSFET 3B1 starts the turn-on operation. Consequently, the drain-source voltage of the power MOSFET 3B1 drops, which in turn results in a flow of a current through the feedback capacitor 3B3 in a direction from the G terminal to the D terminal according to its relative voltage change. With this, negative feedback is applied in a direction to lower the gate voltage.

Assuming that the current value by the constant current source 3B2 is Ig, the capacitance of the feedback capacitor 3B3 is Cr, and the forward transfer admittance of the power MOSFET 3B1 is very large, the following formula is established.

$$Ig = Cr \times (dVo/dt)$$

This formula is rewritten as follows:

$$dVo/dt = Ig/Cr \tag{1}$$

The formula (1) indicates that when the current value Ig and the capacitance Cr are constant, the time rate of change (slew rate) of the drain voltage is constant.

On the other hand, the drain current Id of the power MOSFET 3B1 is defined by the following formula.

$$Id = Co \times (dVo/dt)$$

Therefore, the above formula (1) can be rewritten as follows.

$$Id = (Co/Cr) \times Ig \tag{2}$$

The formula (2) indicates that when the capacitance Co is known, it is possible to keep the drain current Id of the power MOSFET 3B1 constant regardless of the resistance value of the protective resistor 5B.

The above explanation is directed to an example of the operation of turning on the power MOSFET 3B1 in the period of Phase [2], but the operation of turning on the power MOSFET 3A1 in the period of Phase [6] is exactly the same. That is, the time rate of change of the drain voltage of the power MOSFET 3A1 can be kept constant. Therefore, it is possible to keep the drain current of the power MOSFET 3A1 constant regardless of the resistance value of the protective resistor 5A.

Now, the advantages of the polarity switching high-voltage power supply device of this embodiment with respect to the conventional power supply device recited in Patent Document 1 will be described in detail. Comparison items are the resistance value of the protective resistor and the discharging time under the same conditions. The conditions are as follows.

<Condition 1> It is assumed that the output voltage ±HV of the positive (negative) voltage generation unit 1A(1B) is ±10 [kV].

<Condition 2> It is assumed that the capacitance of the output capacitor 4 including the load capacitance is 10 nF, and the capacitance of each of the capacitors 21A and 31A (21B and 31B) included in the voltage generation unit 1A(1B) are sufficiently small and negligible, as compared with the output capacitor 4. In addition, the resistance value of the load 100 is sufficiently large as compared with the output impedance of the power supply device, and the current flowing through the load 100 is negligible.

<Condition 3> It is assumed that the maximum switching power of the power MOSFET 3A1(3B1) is 100 [W].

<Condition 4> It is assumed that the maximum conduction current of the power MOSFET 3A1(3B1) is 1 [A].

In a conventional power supply, the maximum switching power of the power MOSFET is a constraint of the resistance value of the protective resistor. That is, in a conventional power supply, the lower limit of the resistance value of the protective resistor is as follows.

$$R<min>=10 \text{ [kV]}^2/100 \text{ [W]} = 1 \text{ [M}\Omega\text{]}$$

Further, in a conventional power supply device, the discharging time "td" is as follows.

$$td = 3 \times \tau = 3 \times 1 \text{ [M}\Omega\text{]} \times 10 \text{ [nF]} = 30 \text{ [ms]}$$

On the other hand, in the polarity switching high-voltage power supply device of this embodiment, the maximum conduction current 1[A] of the power MOSFET 3A1(3B1) is a constraint of the resistance value of the protective resistor 5A(5B). That is, in this power supply device, the lower limit of the resistance value of the protective resistor is as follows.

$$R<min>=10 \text{ [kV]}/1 \text{ [A]} = 10 \text{ [k}\Omega\text{]}$$

Since the maximum switching power is 100 [W], the Id is as follows.

$$Id = 100 \text{ [W]}/10 \text{ [kV]} = 10 \text{ [mA]}$$

Therefore, the discharging time "td" is as follows.

$$Td = 10 \text{ [nF]} \times 10 \text{ [kV]}/10 \text{ [mA]} = 10 \text{ [ms]}$$

As described above, in the high-voltage power supply device of this embodiment, the discharging time can be shortened to ⅓ of the conventional high-voltage power supply device. Further, the resistance value of the protective resistor can be reduced to 1/100 of the conventional high-voltage power supply device.

Figure 6:
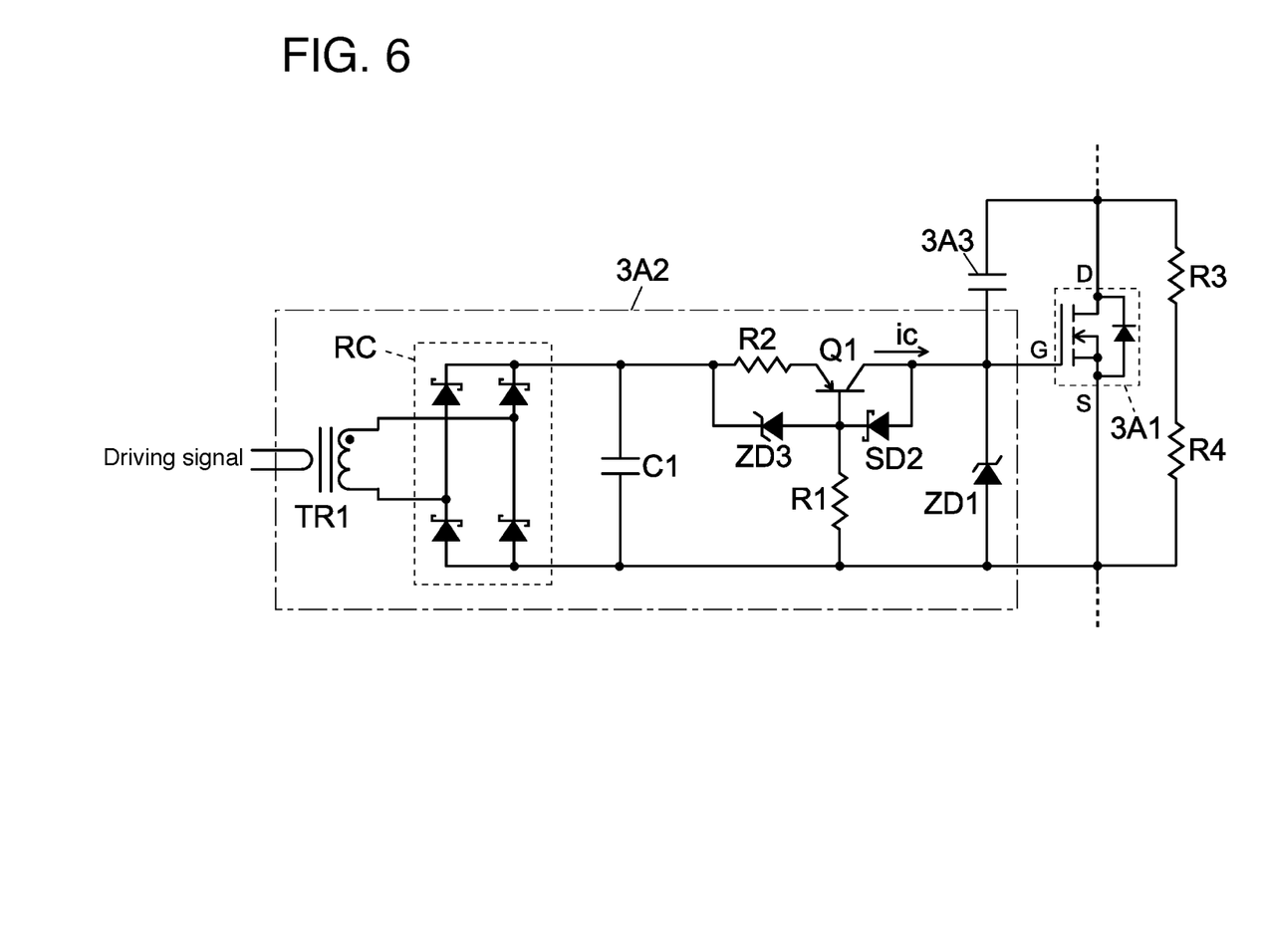
FIG. 6 is a diagram illustrating an example of a circuit of a high-voltage switch unit in the polarity switching high-voltage power supply device of the embodiment.

In the polarity switching power supply device of this embodiment, as the constant current source 3A2(3B2) constituting the high-voltage switch unit 3A(3B), circuitries of various well-known configurations can be adopted. An example of the circuit is shown in FIG. 6.

The constant current source in this case is a common one utilizing a PNP transistor. A resistor R2 is connected to the emitter terminal of the transistor Q1, and a Zener diode ZD3 is connected between the other end of the resistor R2 and the base terminal of the transistor Q1. Further, a resistor R1 is connected to the base terminal of the transistor Q1.

When the transistors Q1 are turned on, in general, a collector current $ic=(V_{ZD}-V_{be})/R2$ (where $V_{ZD}$ is a Zener voltage of the Zener diode ZD3, $V_{be}$ is a base-emitter voltage of the transistors Q1) flows through the transistor Q1 as a constant current.

Note that the resistors R3 and R4 connected between the drain and the source of the power MOSFET 3A1 is intended to reduce the effect of the imbalance of the applied voltage per one stage of the MOSFET at the time of turning off, which is caused due to variations in the drain-source breaking current of the power MOSFET, in a case where a plurality of power MOSFETs is connected in series as described later.

In the circuit shown in FIG. 6, the driving signal supplied from the driver 8 is transmitted through the pulse transformer TR1, rectified by the rectifying circuit RC which is a bridge circuit by Schottky barrier diodes, and supplied to the base terminal of the transistor Q1. With this, the transistor Q1 shifts to the ON state.

Conversely, when the driving signal from the driver 8 is stopped, the voltage application to the emitter terminal and the base terminal of the transistor Q1 is stopped, and the transistor Q1 is cut off. Then, the charges stored between the gate and the source of the power MOSFET 3A1 pass through the collector-base of the transistor Q1 and the Schottky barrier diode SD2, and is consumed by the resistor R1, eventually causing the power MOSFET 3A1 to turn OFF.

That is, in this circuit, the resistor R1 corresponds to the bleeder resistor. As described above, in this circuit, since the driver 8 and the power circuit including the power MOSFET are connected via the pulse transformer TR1, it is advantageous that it is possible to electrically insulate the driver 8 and the power circuit.

[Modifications]

The polarity switching high-voltage power supply device of the above-described embodiment is merely one example of the present invention, and various modifications such as the following can be made.

In the polarity switching high-voltage power supply device of the above-described embodiment, a single power MOSFET is used as the semi-conductor switch in the high-voltage switching unit 3A(3B), but in relation to the withstand voltage, a plurality of power MOSFETs may be connected in series in a multi-stage manner. In such a case, it may be configured such that each power MOSFET is provided with a constant current source and a feedback capacitor so that the time rate of change of the drain-source voltage becomes constant at the time of the turn-on operation. Further, as the semiconductor switch, it is also possible to use a voltage-controlled semiconductor switch other than a power MOSFET.

Specifically, a single insulated gate bipolar transistor (IGBT) or a plurality of IGBTs connected in series in a multi-stage manner may be used. In a case of using an IGBT as a semiconductor switch, it is needless to say that the drain, the source, and the gate in the power MOSFET described above correspond to the collector, the emitter, and the base, respectively. Even in a case where the IGBT is used, the operation is the same as that when a power MOSFET is used.

Further, in the polarity switching high-voltage power supply device of the above-described embodiment, a combination of the constant current source 3A2(3B2) and the feedback capacitor 3A3(3B3) is used to make the time rate of change of the drain-source voltage at the time of turning on the power MOSFET 3A1(3B1) substantially constant, but the same function can be realized by other configurations. For example, it is possible to use a feedback circuit using an OP amplifier (operational amplifier) or the like in which the drain-source voltage of the power MOSFET 3A1(3B1) is monitored in real-time and the gate-source voltage is controlled such that the time rate of change of the voltage becomes a target value (i.e., becomes constant).

Further, the configuration of the excitation circuit 1A1 (1B1) included in the positive voltage generation unit 1A (negative voltage generation unit 1B) is not limited as long as it is possible to output a high-voltage AC signal. However, typically, it may be configured to include, for example, an AC-DC converter for converting commercial AC power to DC power, a switching element, such as, e.g., a power MOSFET for switching the DC current by the AC-DC converter, or a transformer including a primary winding to which the switching current is supplied.

Further, the present invention is not limited to the above-described embodiments and the above-described various types of modifications, and it is needless to say that appropriate modifications, additions, and modifications may be made within the claims.

[Various Aspects]

It will be appreciated by those skilled in the art that the above-described exemplary embodiments are illustrative of the following aspects.

(Item 1)

One aspect of the high-voltage power supply device according to the present invention is a high-voltage power supply device capable of outputting a high voltage of a positive polarity and a negative polarity in a switchable manner. The high-voltage power supply device is provided with:

a first voltage generation unit configured to output the high voltage of the positive polarity;

a second voltage generation unit configured to output the high voltage of the negative polarity;

a first discharging diode connected to a voltage output end of the first voltage generation unit such that when a high voltage is outputted to the voltage output end of the first voltage generation unit, the high voltage is applied to the first discharging diode in a reverse biased state;

a second discharging diode connected to a voltage output end of the second voltage generation unit such that when a high voltage is outputted to the voltage output end of the second generation unit, the high voltage is applied to the second discharge diode in a reverse biased state;

a first output circuit connected between the voltage output end of the first voltage generation unit and a polarity switching voltage output end which is common to both the positive polarity and the negative polarity, the first output circuit being configured by a first switch and a protective resistor connected in series to each other, the first switch being configured by a voltage-controlled semiconductor switch;

a second output circuit connected between the voltage output end of the second voltage generation unit and the polarity switching voltage output end, the second output circuit being configured by a second switch and a protective resistor connected in series to each other, the second switch being configured by a voltage-controlled semiconductor switch;

an output capacitor connected in parallel to a load that is to be connected to the polarity switching voltage output end;

a controller configured to control operations of the first voltage generation unit and the second voltage generation unit and opening/closing operations of the first switch and the second switch such that both the first voltage generation unit and the second voltage generation unit are turned on once in a state in which both the operations of the first voltage generation unit and the second voltage generation unit are stopped, when switching a polarity of a voltage outputted from the polarity switching voltage output end;

a first limitation unit configured to limit a time rate of change of a voltage between both ends of the first switch when the controller turns on the first switch; and a second limitation unit configured to limit a time rate of change of a voltage between both ends of the second switch when the controller turns on the second switch.

(Item 2)

In the high-voltage power supply device as recited in the above-described Item 1, it may be configured such that the first switch and the second switch are each configured by a MOSFET (metal-oxide-semiconductor field-effect transistor), and the first limitation unit and the second limitation unit are each configured to limit a time rate of change of a drain-source voltage in a turn-on operation of the MOSFET, the first limitation unit and the second limitation unit each including a feedback capacitor and a constant current source, the feedback capacitor being connected between a gate and a drain of the MOSFET, the constant current source being connected between a gate and a source of the MOSFET to supply a current in a direction from a source side toward a gate side.

(Item 3)

In the high-voltage power supply device as recited in the above-described Item 1, it may be configured such that the first switch and the second switch are each configured by a plurality of MOSFETs (metal-oxide-semiconductor field-effect transistors) connected in series, and the first limitation unit and the second limitation unit are each configured to limit a time rate of change of a drain-source voltage in a turn-on operation of the MOSFET, the first limitation unit and the second limitation unit each including a feedback capacitor and a constant current source, the feedback capacitor being connected between a gate and a drain of the MOSFET, the constant current source being connected between a gate and a source of the MOSFET to supply a current in a direction from a source side toward a gate side.

(Item 4)

In the high-voltage power supply device as recited in the above-described Item 1, it may be configured such that the first switch and the second switch are each configured by an IGBT (insulated gate bipolar transistor), and the first limitation unit and the second limitation unit are each configured to limit a time rate of change of a collector-emitter voltage in a turn-on operation of the IGBT, the first limitation unit and the second limitation unit each including a feedback capacitor and a constant current source, the feedback capacitor being connected between a base and a collector of the IGBT, the constant current source being connected between a base and an emitter of the IGBT to supply a current in a direction from an emitter side toward a base side.

(Item 5)

In the high-voltage power supply device as recited in the above-described Item 1, it may be configured such that the first switch and the second switch are each configured by a plurality of IGBTs (insulated gate bipolar transistors), and the first limitation unit and the second limitation unit are each configured to limit a time rate of change of a collector-emitter voltage in a turn-on operation of each IGBT, the first limitation unit and the second limitation unit each including a feedback capacitor and a constant current source, the feedback capacitor being connected between a base and a collector of each IGBT, the constant current source being connected between a base and an emitter of each IGBT to supply a current in a direction from an emitter side toward a base side.

In the high-voltage power supply device as recited in the above-described Items 1 to 5, when the controller turns on the first switch or the second switch, which is, for example, a power MOSFET or IGBT, the second limitation unit or the second limitation unit maintains the time rate of change of the voltage across the first switch or the second switch substantially constant.

Therefore, the current flowing through the switch also becomes constant at the time of the turn-on operation of the first switch (the second switch). This makes it possible to limit the current flowing through the switch due to the charges discharged from the output capacitor or the like at the time of the turn-on operation, without depending on the protective resistor whose main object is to limit a surge current. Therefore, the resistance value of the protective resistor can be determined without being restricted by the maximum switching power permitted by the switch. Consequently, it is possible to set the resistance value of the protective resistor lower than the conventional device while suppressing the maximum rating of current of the first switch (the second switch). By reducing the output impedance by decreasing the resistance value of protective resistor, it is possible to suppress the variations of the output voltage load at the time of the current sudden change.

As described above, according to the high-voltage power supply device as recited in any one of the above-described Items 1 to 5, it is possible to suppress the variations of the output voltage at the time of the sudden change in the load current, without adopting a large-sized high-voltage switch having a larger maximum rating of current, which leads to an increase in size and cost of the device. Thus, for example, in a case where the high-voltage power supply device as recited in any one of the above-described Items 1 to 5 is used as a power supply for an orthogonal ion accelerating section in an OA-TOFMS, the variations of the injection voltage can be suppressed even if the amount of ions to be introduced into the orthogonal ion accelerating section varies greatly, and the mass accuracy and the mass resolution can be kept at a high level.

DESCRIPTION OF SYMBOLS

1A: Positive voltage generation unit
1B: Negative voltage generation unit

1A1, 1B1: Excitation circuit
1A2, 1B2: Rectifying circuit
1A3, 1B3: Filtering circuit
2A, 2B: Discharging diode
3A, 3B: High-voltage switch unit
   3A1, 3B1: Power MOSFET
   3A2, 3B2: Constant current source
   3A3, 3B3: Feedback capacitor
4: Output capacitor
5A, 5B: Protective resistor
6: Common voltage output end
7: Controller
8: Driver
100: Load

The invention claimed is:

1. A high-voltage power supply device capable of outputting a high voltage of a positive polarity or a negative polarity in a switchable manner, comprising:
a first voltage generation unit configured to output the high voltage of the positive polarity;
a second voltage generation unit configured to output the high voltage of the negative polarity;
a first discharging diode connected to a voltage output end of the first voltage generation unit such that when a high voltage is outputted to the voltage output end of the first voltage generation unit, the high voltage is applied to the first discharging diode in a reverse biased state;
a second discharging diode connected to a voltage output end of the second voltage generation unit such that when a high voltage is outputted to the voltage output end of the second voltage generation unit, the high voltage is applied to the second discharge diode in a reverse biased state;
a first output circuit connected between the voltage output end of the first voltage generation unit and a polarity switching voltage output end which is common to both the positive polarity and the negative polarity, the first output circuit being configured by a first switch and a protective resistor connected in series to each other, the first switch being configured by a voltage-controlled semiconductor switch;
a second output circuit connected between the voltage output end of the second voltage generation unit and the polarity switching voltage output end, the second output circuit being configured by a second switch and a protective resistor connected in series to each other, the second switch being configured by a voltage-controlled semiconductor switch;
an output capacitor connected in parallel to a load that is to be connected to the polarity switching voltage output end;
a controller configured to control operations of the first voltage generation unit and the second voltage generation unit and opening/closing operations of the first switch and the second switch such that both the first voltage generation unit and the second voltage generation unit are turned on once in a state in which both the operations of the first voltage generation unit and the second voltage generation unit are stopped, when switching a polarity of a voltage outputted from the polarity switching voltage output end;
a first limitation unit configured to limit a time rate of change of a voltage between both ends of the first switch when the controller turns on the first switch; and
a second limitation unit configured to limit a time rate of change of a voltage between both ends of the second switch when the controller turns on the second switch.

2. The high-voltage power supply device as recited in claim 1,
wherein the first switch and the second switch are each configured by a MOSFET (metal-oxide-semiconductor field-effect transistor), and
wherein the first limitation unit and the second limitation unit are each configured to limit a time rate of change of a drain-source voltage in a turn-on operation of the MOSFET, the first limitation unit and the second limitation unit each including a feedback capacitor and a constant current source, the feedback capacitor being connected between a gate and a drain of the MOSFET, the constant current source being connected between the gate and a source of the MOSFET to supply a current in a direction from a source side toward a gate side.

3. The high-voltage power supply device as recited in claim 1,
wherein the first switch and the second switch are each configured by a respective plurality of MOSFETs (metal-oxide-semiconductor field-effect transistors) with each MOSFET of the respective plurality connected in series, and
wherein the first limitation unit and the second limitation unit are each configured to limit a time rate of change of a drain-source voltage in a turn-on operation of a MOSFET of the respective plurality of MOSFETs, the first limitation unit and the second limitation unit each including a respective feedback capacitor and a respective constant current source, the respective feedback capacitor of each limitation unit being connected between a gate and a drain of a respective MOSFET of the respective plurality of MOSFETs, the respective constant current source being connected between the gate and a source of the respective MOSFET of the respective plurality of MOSFETs to supply a current in a direction from a source side toward a gate side.

4. The high-voltage power supply device as recited in claim 1,
wherein the first switch and the second switch are each configured by an IGBT (insulated gate bipolar transistor), and
wherein the first limitation unit and the second limitation unit are each configured to limit a time rate of change of a collector-emitter voltage in a turn-on operation of the IGBT, the first limitation unit and the second limitation unit each including a feedback capacitor and a constant current source, the feedback capacitor being connected between a base and a collector of the IGBT, the constant current source being connected between the base and an emitter of the IGBT to supply a current in a direction from an emitter side toward a base side.

5. The high-voltage power supply device as recited in claim 1,
wherein the first switch and the second switch are each configured by a respective plurality of IGBTs (insulated gate bipolar transistors), and
wherein the first limitation unit and the second limitation unit are each configured to limit a time rate of change of a collector-emitter voltage in a turn-on operation of a respective IGBT of the respective plurality of IGBTs, the first limitation unit and the second limitation unit each including a respective feedback capacitor and a respective constant current source, the respective feedback capacitor of each limitation unit being connected between a base and a collector of a respective IGBT of the respective plurality of IGBTs, the respective constant current source being connected between the base and an emitter of a respective IGBT of the respective plurality of IGBTs to supply a current in a direction from an emitter side toward a base side.

* * * * *